United States Patent [19]

Jensen

[11] 4,121,681
[45] Oct. 24, 1978

[54] TRACTOR WITH DEMOUNTABLE COMPONENTS

[76] Inventor: John C. Jensen, 70 van Buren St., P.O. Box 271, South Haven, Mich. 49090

[21] Appl. No.: 744,614

[22] Filed: Nov. 24, 1976

[51] Int. Cl.² ............................................. B60K 5/10
[52] U.S. Cl. .............................. 180/54 D; 180/1 F; 180/70 R; 280/781
[58] Field of Search ............. 180/1 F, 11, 70 R, 80 A, 180/87, 77 R, 54 D; 280/111, 490, 106 R; 192/16; 74/471 R

[56] References Cited

U.S. PATENT DOCUMENTS

| | | | |
|---|---|---|---|
| 1,903,968 | 4/1933 | Hosmer | 180/1 F |
| 2,340,134 | 1/1944 | Maxon | 180/54 D X |
| 2,989,134 | 6/1961 | Kamlukin | 180/77 R |
| 3,661,223 | 5/1972 | Jensen | 180/54 D |

Primary Examiner—Robert R. Song
Assistant Examiner—Terrance L. Siemens
Attorney, Agent, or Firm—Blanchard, Flynn, Thiel, Boutell & Tanis

[57] ABSTRACT

Tractor, especially farm tractor. A tractor construction is disclosed which is particularly adaptable for manufacture as a plurality of independent units, shipment of same in knock-down form and assembly and maintenance by unskilled labor using only simple tools. The construction comprises a unitary frame member together with independent and separable components including a front end assembly, an engine assembly, a control unit assembly and a rear end assembly. Each of these assemblies are mountable on the frame structure independently of each other and interconnection therebetween is held to a minimum. Maintenance is likewise at a minimum and the above-mentioned assemblies can be replaced if necessary by unskilled labor and with use of only simple tools.

7 Claims, 10 Drawing Figures

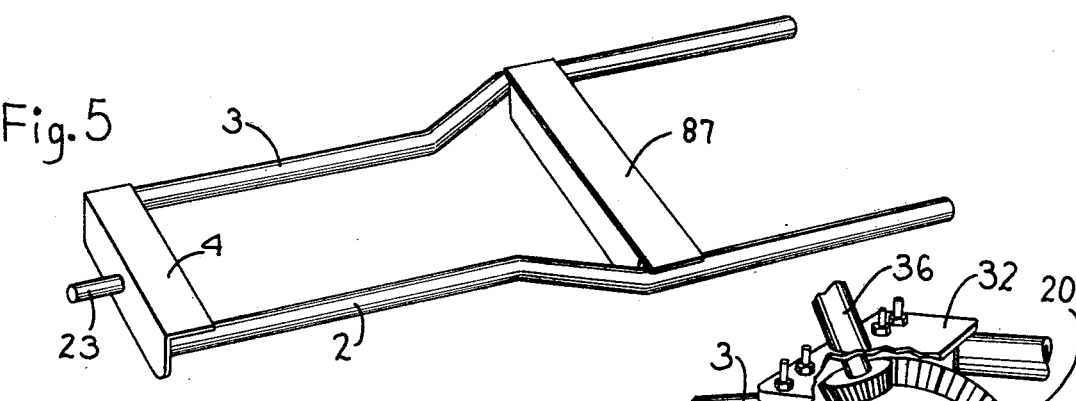
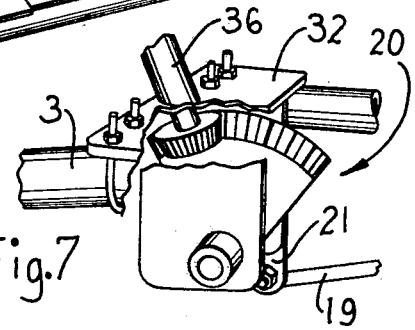
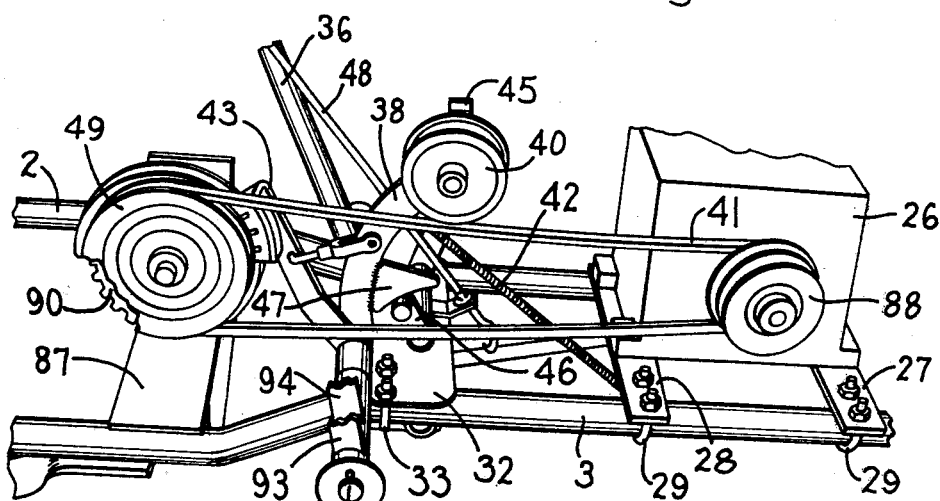
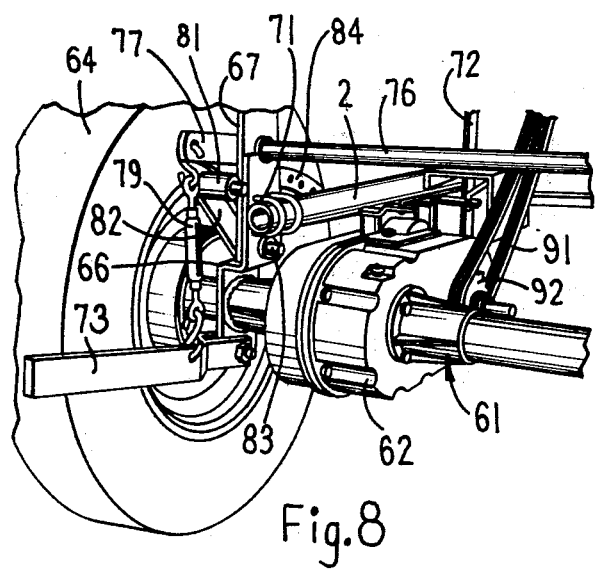
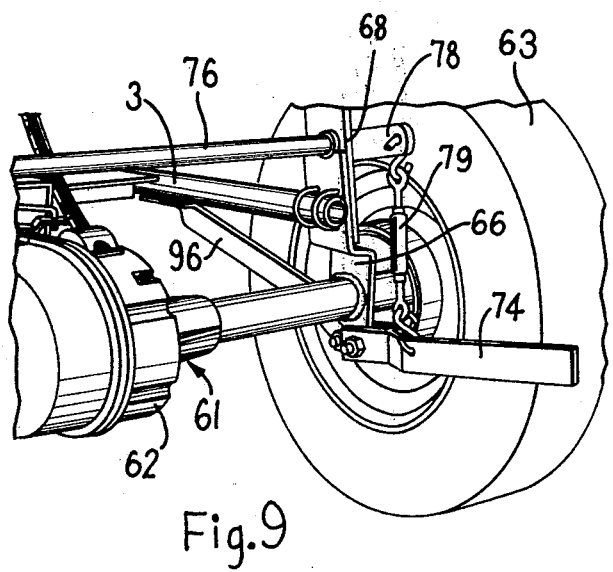

TRACTOR WITH DEMOUNTABLE COMPONENTS

FIELD OF THE INVENTION

This invention relates to a tractor and in particular to a tractor having an improved frame structure to facilitate assembly, maintenance and replacement of parts by nonskilled personnel.

BACKGROUND OF THE INVENTION

Farming in this country is an advanced technology and most farms are of large size in order to efficiently and economically utilize the more advanced scientific principles and farm machinery presently available. The farm machinery, and particularly tractors, utilized on modern farms in this country are expensive and complex since such tractors must be able to perform in accordance with the modern scientific farming principles now in common usage. Further, the tractors must be able to perform large quantities of work due to the large size of present day farms.

While most tractors produced in this country are highly desirable when used on large farms, and where sufficient skilled personnel is available to perform the necessary repair and maintenance thereon, it has been found that such large and complex tractors are not suitable for use on relatively small farms since such tractors are not only unacceptably expensive, but they are also mechanically and structurally complex so that maintenance and repair is made unduly difficult, if not impossible.

In particular, there presently exists a need in foreign countries, such as in Central and South America, Africa and Southeast Asia, for a tractor which is relatively inexpensive and which is mechanically and structurally simple to repair and operate. These countries still have large numbers of small farms which are run by one or two persons. Further, the small farms in these countries do not utilize the modern mass farming techniques utilized in this country and thus the highly automated and complex machinery suitable for farming in this country is not suitable for farming in these foreign countries.

Further, the tenants or owners of the small farms in these less advanced farming countries do not possess the technical skill, tools or equipment necessary to permit assembling, maintenance or repair of the complex tractors or farm machinery utilized in this country. Further, necessary repair parts are often not easily obtainable in these foreign countries and thus the complex tractors presently utilized in this country have proven undesirable for use in these foreign countries since the inability to obtain replacement parts for purposes of repair generally results in the tractor being shut down for extended periods of time, thereby completely destroying the usefulness of the tractor and imposing a severe handicap on the farmer.

In my earlier U.S. Pat. No. 3,661,223 I have disclosed and claimed a tractor construction directed toward meeting these problems and the construction therein set forth does in fact go a long way toward accomplishing these ends. However, in a continuing effort to provide a tractor of the maximum simplicity for construction, assembly and maintenance, I have attempted to carry still further the concepts of simplicity, replacement of parts, shipment in knock-down condition and assembly by unskilled personnel using only simple tools.

Accordingly, the objects of the invention include:

1. To provide a farm-type tractor having a simplified frame structure which facilitates assembly, maintenance and repair of the tractor.

2. To provide a tractor, as aforesaid, wherein each major component of the tractor, namely forward wheel assembly, engine, control assembly and rear axle and seat supporting assembly, are each made in a unitary manner and each detachably connectible to the frame in a simple manner to facilitate assembly, maintenance, repair and replacement of parts.

3. To provide a tractor, as aforesaid, which can be easily assembled, maintained and repaired by technically unskilled persons.

4. To provide a tractor, as aforesaid, which can be easily shipped in a disassembled form for export purposes, with the tractor being easily assembled by unskilled personnel without requiring any elaborate tools or machinery.

5. To provide a tractor, as aforesaid, which is relatively inexpensive to manufacture and maintain, and is dependable and simple in operation.

6. To provide a tractor, as aforesaid, wherein many of the elements of the frame and supporting members for the axles are constructed from simple structural members, thereby facilitating not only assembly and repair, but also permitting easy replacement of parts.

Other objects and purposes of this invention will be apparent to persons acquainted with devices of this type upon reading the following specification and inspecting the accompanying drawings.

BRIEF DESCRIPTION OF THE DRAWINGS

FIG. 5 is an oblique view of the frame of the structure separate from other parts normally associated therewith.

FIG. 6 is a fragmentary right side perspective view of the central portion of the tractor structure taken from a point slightly above the plane of the frame.

FIG. 7 is a fragmentary partially broken view of a central portion of the tractor showing the steering mechanism.

FIG. 8 is an oblique rear view of the left rear end of the tractor.

FIG. 9 is an oblique view of the right rear end of the tractor.

Figure 1:
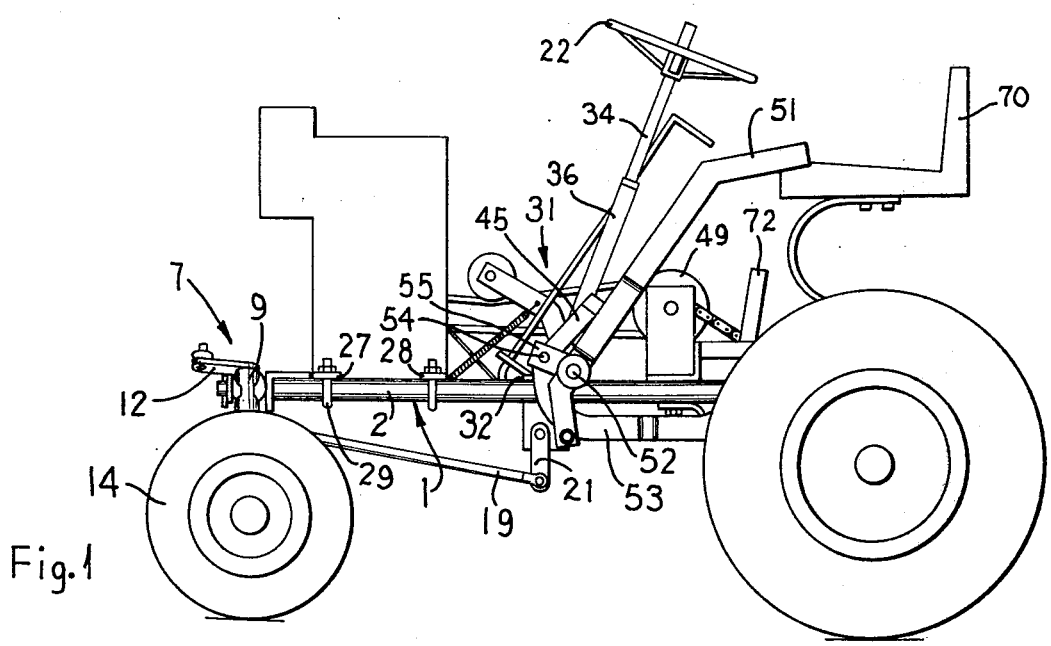
FIG. 1 is a somewhat diagrammatic side elevational view of a tractor embodying the invention as viewed from the left side of the tractor.

Certain terminology will be used in the following description for convenience in reference only and will not be limiting. The words "upwardly," "downwardly," "rightwardly" and "leftwardly" will designate directions in the drawings to which reference is made. The words "front" and "rear" will refer in a conventional manner to the forward and rearward ends of the vehicle and designated parts thereof, which ends are the leftward and rightward ends, respectively, in FIG. 1. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

The objects and purposes of the present invention are met by providing a tractor having a generally U-shaped, at least partially tubular, frame comprising a pair of spaced parallel side members and a connecting front cross member together with further reinforcing cross members as needed and a plurality of unitary components of which each can be fixed separately to such frame. Specifically, the front wheel assembly is complete in itself and attachable to the forward end of the frame by a single bolt means. The engine is likewise attachable by independent releasable means such as U-bolts or similar. The control assembly consisting of steering, shifting, power and brake, and throttle means is likewise releasably fastenable as a unit onto said frame structure and operatively connected to other components of the tractor and, finally, a rear axle assembly carrying also the seat and draw bar means is constructed in a unitary manner and attachable by simple means, such as a pair of U-bolts, releasably to the frame and operatively connected to the rest of the machine.

DETAILED DESCRIPTION

The tractor comprises a generally U-shaped frame 1 having tubular side members 2 and 3 and a front cross member 4, here comprising an angle member connecting the front ends of said side members.

The unitary front assembly 7 comprises a tubular cross member 8 having wheel bearings 9 and 11 supported at each end thereof. Suitable rods extend therethrough, provided with any convenient means, not shown, for carrying the load, said rods having at their upper ends steering cranks 12 and 13 and at their lower ends the respective front wheels 14 and 16. A connecting rod 17 connects said steering cranks 12 and 13 in the usual manner. Any convenient means for applying steering torque to said wheels such as the crank 18 is fixed to a suitable portion of the steering system, here the rod connected to the wheel 14 and the same is then connected by a pitman 19 to a crank 21 responsive through conventional gearing 20 (FIG. 7) to rotation of the steering wheel 22.

A pin 23 projects forwardly from the cross bar 4 of the frame and is received into the cross bar 8 of the front end assembly. Same may be fastened in place in any convenient manner such as by a cotter pin 24.

It will thus be seen that such front end assembly is completely self-contained, can be manufactured and shipped separately from the frame structure but can be fastened thereto in a simple manner merely by mounting said cross bar 8 onto the pin 23 and connecting the pitman 19 to the crank 18. While the frame mounting of pin 23 is preferred, a revised arrangement is contemplated as an alternative wherein such a pin mounts on the front end assembly cross bar 8 and is received in an opening in the frame cross bar 4.

The engine which is generally indicated at 26 is of any conventional type and is fixed to a pair of cross straps 27 and 28 which are in turn mounted onto the frame 1 in any convenient manner, such as by a plurality of U-bolts of which one is indicated at 29.

Thus, the engine also may be shipped separately from the frame structure and is quickly and easily mounted thereon by the use of only simple tools, such as a wrench.

Figure 2:
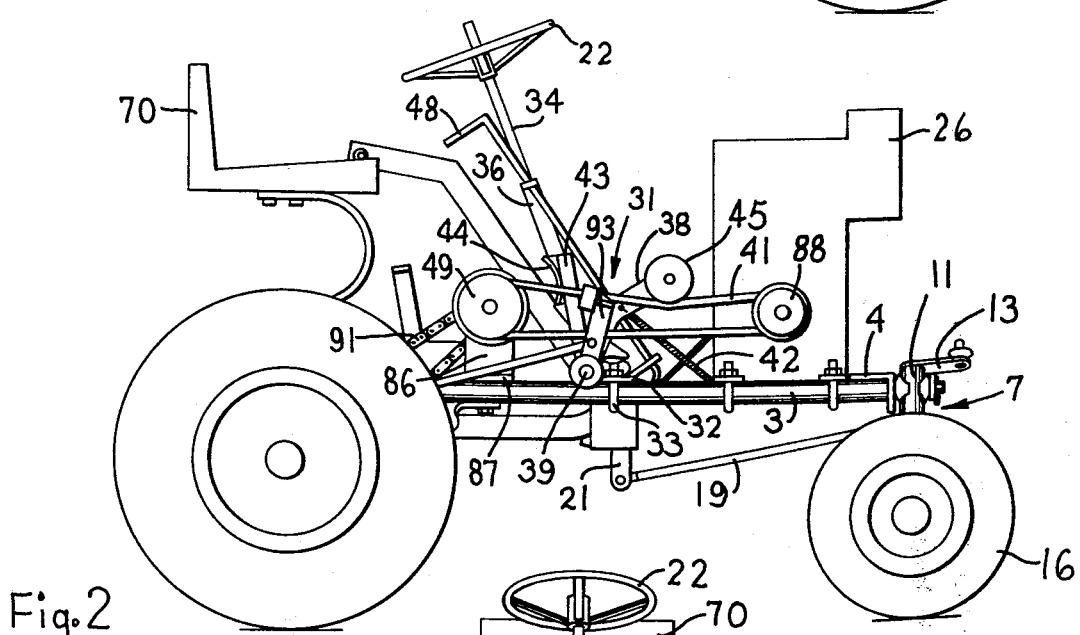
FIG. 2 is a generally similar view of the tractor as viewed from the right side of the tractor.
Figure 3:
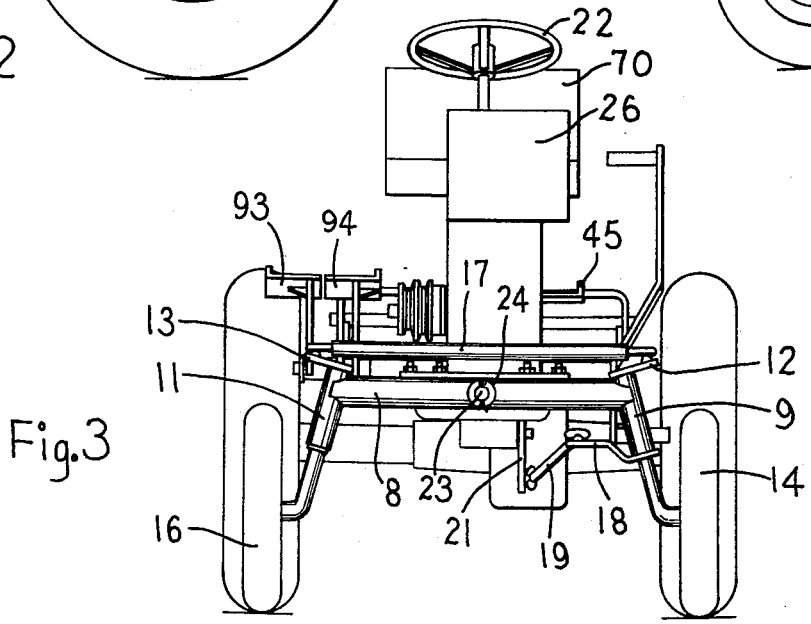
FIG. 3 is a front assembly view of the tractor.

Turning now to the control assembly indicated generally at 31, this comprises a unitary grouping of control devices for effecting the several functions of steering, clutching, braking and lifting of the tool being drawn by the tractor. All of these units are mounted onto a single cross plate 32 which is itself mounted onto the frame of the tractor by any convenient means such as U-bolts of which one is indicated at 33 (FIG. 2).

While the specific details of the units mounted onto the plate 32 form of themselves no part of the invention, inasmuch as they can be provided in any of many presently known ways, a brief description of the particular ones herein provided will be given to assist in a full understanding of the invention.

The steering wheel 22 is mounted in a conventional manner onto a rotatable shaft 34 which is received into a tubular support 36. Said tubular support is fixed rigidly to the plate 32 in any convenient manner, such as by welding. The shaft 34 extends through said plate 32 and is connected by any convenient gear and rod arrangement 20 (FIG. 7) to the crank 21. Said gear and rod arrangement may be of any conventional type operatively mounted on the underside of said plate 32 and functioning in any conventional manner to convert rotary motion of the shaft 34 into pivotal motion of the crank 21. Since many devices of this nature are already known, further details hereof need not be given.

Figure 10:
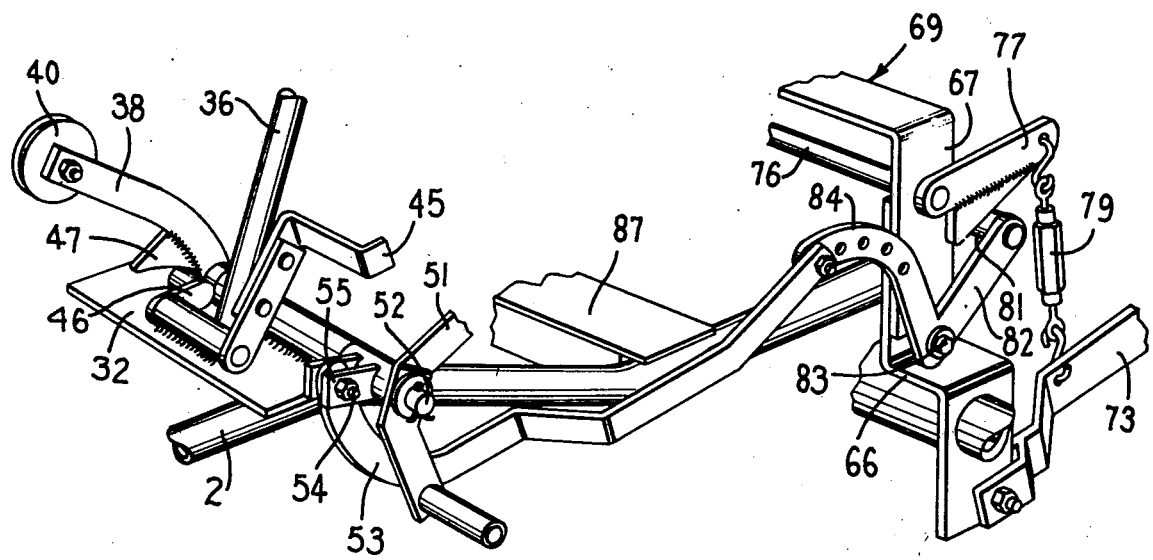
FIG. 10 is an oblique view of the left-hand side of the tractor with the rear left wheel removed.

The clutch structure comprises a clutch arm 38 pivotally mounted by a shaft 39 onto the plate 32 and supporting a roller 40 which bears against a hereinafter described drive belt 41 for tightening same and effecting driving of the driving mechanism. Resilient means such as a spring 42 are provided for holding said roller normally against said belt. A brake arm 43 is fixed rigidly with respect to the clutch arm 38 and carries a brake shoe 44 adapted for bearing against the hereinafter further described driven pulley 49, the relationship being such that said brake shoe 44 is disengaged when the roller 40 is engaged as shown in FIGS. 2 and 6 and the roller 40 is disengaged when the brake shoe 44 is engaged. Same are operated by a single control, in this case the pedal 45 acting through a crank and roller assembly 46 and a cam 47 driven thereby (FIG. 10).

A conventional rod 48 is manually operable and is provided with suitable linkage not shown for operating the engine throttle in a known manner.

The lever 51 is pivotally mounted at 52 onto the plate 32 for operation of the tool lifting means and carries fixedly therewith a stub lever 55. A portion of such means further described hereinafter comprises a lever 53 which is pivotally connected at 54 to the adjacent end of lever 55.

Thus, the plate 32 carries as a unitary component all of the foregoing above-described control means and same is releasably fastenable to the frame 1 by any convenient means such as U-bolts of which one is shown at 33.

Turning now to the rearward end of the tractor, there is provided an axle, or rear end, assembly 61 preferably including a conventional transmission-differential unit 62 referred to as a transaxle, and having drive wheels 63 and 64 supported at the ends thereof. Brackets 66 are fixed as by welding to the axle 61 and extend upwardly for mating with the downwardly directed portions 67 and 68 of a seat bracket 69. Said brackets 66 and the seat bracket 69 are removably affixed to the frame 1 in any convenient manner, such as by U-bolts of which one appears at 71. A suitable control for the transaxle 62 of any conventional sort is provided and is operable as convenient, such as by the manual lever 72. A seat, as at 70, may be mounted as desired on the seat bracket 69.

Draw bars 73 and 74 are provided on downwardly extending portions of the brackets 66 and are pivotal on each thereof for movement in a vertical plane. A third point link, not shown, may be mounted if needed onto the seat bracket 69. A rod 76 is pivotally supported in the downwardly extending portions 67 and 68 of the bracket 69 and carry on the respective ends thereof levers 77 and 78, each of which is affixed to the draw bars by suitable means of adjustable length such as the turnbuckle linkages shown at 79. A cam roller 81 is supported on lever 82, bears against the underside of the lever 77 and is pivotally mounted at 83 onto the bracket 67. A lever 84 is connected to the lever 82 and is in turn connected to and operable by the lever 53 above mentioned. Thus, a rearward pull on the upper manually grasped end of the lever 51 acts through the stub lever 55 onto the lever 53 and thence to actuate the lever 84 to move the lever 82 upwardly. This drives the cam against the underside of the lever 77 to move same upwardly. This acts both directly onto the draw bar 73 and through the rod 76 onto the draw bar 74 for moving both of same upwardly and thereby lifting the tool out of the ground. Reverse movement of the lever 51 reverses the above-described operation and returns the tool into contact with the ground.

A pulley and sprocket combination including the driven pulley 49 are rotatably mounted onto a bracket 86 which is rigidly mounted onto a plate 87 and same is in turn rigidly mounted onto the frame 1 as by welding. A belt 41 connects the output pulley 88 of the engine to the driven pulley 49 and this in turn acts through a sprocket 90 (FIG. 6) to drive the chain 91 which in turn drives the input sprocket 92 of the transaxle 62. While this drive arrangement is preferred, the invention in its broader aspects contemplates other drive arrangements, of conventional kind, such as a bell housing and clutch connection, a hydrostatic or hydraulic drive, etc.

Figure 4:
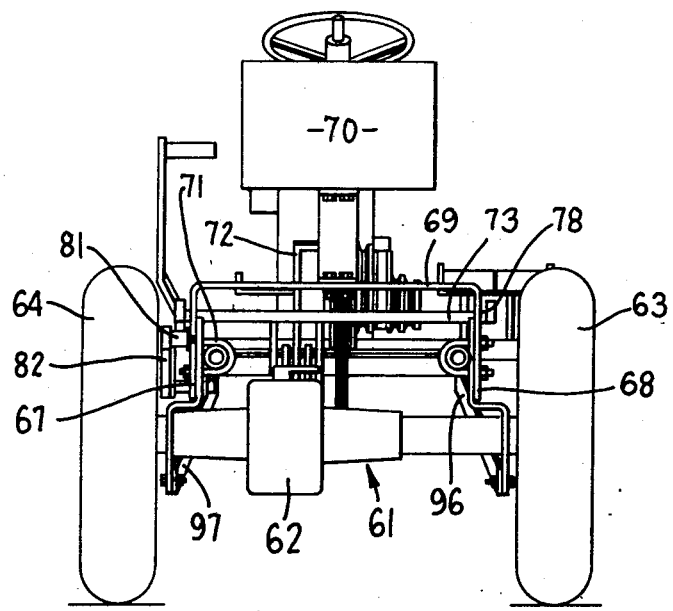
FIG. 4 is a rear elevational view of the tractor.

Pedals 93 and 94 indicate pedals for cable controlled steering brakes (not shown) if desired. Brace means 96 and 97 (FIGS. 4 and 9) may be utilized if desired and fastened to the frame members as member 3, in any convenient manner, as by screws tapped into the side frame members.

It will thus be seen that the frame 1 may be made as a single unitary item as can also the front wheel assembly 7, the engine 26, control assembly 31 and the rear wheel assembly including the seat support bracket 69. With these components packed as individual units, the entire tractor may be shipped in knock-down form but the assembly thereof is extremely simple and requires no more complicated tool than a wrench. It is necessary only to fix the front end assembly onto the pin 23 and insert the cotter pin 24 to position the front end assembly properly on the frame. The engine may be placed as desired, presumably on a marked portion of the frame, merely by fixing and tightening the U-bolts, ones of which are shown at 29. The rear assembly is fixed to the frame as a unit merely by positioning same, inserting and tightening the U-bolts of which one is shown at 71 with the seat then being placed on the cross bar of the seat bracket 69. The control assembly is positionable and fastenable onto the frame as a single unit and its various connecting means such as the pitman 19 and the lift control 53 and the drive belt 41 are then connected to the several required components with which they cooperate.

Likewise, in the event that repair is needed and recognizing that this equipment will normally be used in areas where repair facilities may be unavailable or at least inconvenient for taking the entire tractor thereto, it is necessary only to remove the part which is malfunctioning and take it to a dealer for replacement or to a service location for repair. This detachment can be done easily and quickly, again by the use of only simple tools, such as a wrench, and may then be reinstalled or its replacement installed with equal ease and facility.

The general operation of the tractor is normal and conventional and the operation of the individual parts with respect to each other has been sufficiently indicated above the repetition thereof is not necessary.

While the foregoing-described arrangement comprising separately detachable units for each of the front end assembly, the control assembly and the rear end assembly is preferable for carrying out the purposes of the invention to a maximum degree, it will be recognized that at least some of the objectives of the invention can be accomplished, or all of the objectives accomplished to a lesser degree, if some of these units, such as the control assembly, is divided into two or more sub-assemblies which may then be detachably affixed individually to the frame of the machine. For example, an arrangement is conceivable wherein the brake unit comprises one sub-assembly which is fastened as a unit to such frame, the clutch mechanism comprises another sub-assembly which is separately affixed to said frame and the steering components comprise a third sub-assembly which are separately affixed to the frame of the machine. It is only essential that such parts be mounted fixedly with respect to each other and that they can all be readily removed by the simple withdrawal of a few bolts, screws or similar fastening devices.

While a specific construction of the tractor embodying the invention has herein been set forth for illustrative purposes, it will be recognized that numerous variations may be made in and from the specific design herein employed without departure from the scope of the invention and such variations will be construed as within the scope of the invention excepting as the hereinafter appended claims expressly require otherwise.

The embodiments of the invention in which an exclusive property or privilege is claimed are defined as follows:

1. In a tractor assembly, the combination comprising:
    a frame structure comprising a pair of generally parallel side members and means holding same in fixed relationship with respect to each other;
    a unitary front end assembly including wheels and steering means therefor and means removably fixing said front end assembly in operable relationship to said frame;
    an engine having an output and means removably fixing said engine onto said frame;
    a rear end assembly including drive wheels, axles, a transmission and means conducting output power from said transmission to said axles, and a means removably fixing said rear end assembly onto said frame, means on said rear end assembly also providing for affixing thereto of suitable draw bar means;
    a unitary control assembly including clutch means, steering wheel means and brake means all carried by a single plate which is in turn removably mountable onto said frame;

drive means connecting the output of said engine to the input of said transmission and means operatively connecting said clutch means into said drive means and other means operatively connecting said steering wheel means to the steering means on the front end assembly;

whereby each of the frame, front end assembly, rear end assembly, engine and control assembly can be manufactured and shipped as separate units and same may then be assembled easily and quickly and by the use of only simple tools.

2. The device of claim 1 including draw bar control means also mounted on said control assembly plate.

3. The device of claim 1 wherein said drive means includes a belt-and-pulley arrangement and said clutch means effects power transmission by bearing against said belt in response to pedal actuation thereof.

4. The device of claim 1 wherein said clutch means includes also a brake unit effective for holding said drive means against movement, said clutch means and brake unit being alternately operable with respect to said drive means in response to pedal actuation thereof.

5. The device defined in claim 1 wherein threadedly detachable means are utilized for fixing at least said engine, rear assembly and control assembly on and firmly with respect to said frame.

6. The device defined in claim 1 wherein said frame includes also a cross bar member at the forward end thereof and a pin is fixed rigidly to said cross bar and projects forwardly thereof, said front end assembly being mounted on said pin for pivotal movement in a vertical plane with respect to said frame structure.

7. In a tractor assembly, the combination comprising:

a frame structure comprising a pair of generally parallel side members and means holding same in fixed relationship with respect to each other;

a unitary front end assembly including wheels and steering means therefor and means removably fixing said front end assembly in operable relationship to said frame;

an engine having an output and means removably fixing said engine onto said frame;

a rear end assembly including drive wheels, axles, a transmission and means conducting output power from said transmission to said axles, and a means removably fixing said rear end assembly onto said frame, means on said rear end assembly also providing for affixing thereto of suitable draw bar means;

a control assembly including clutch means, steering wheel means and brake means all carried by mounting means which are in turn rigidly but removably mountable onto said frame;

drive means connecting the output of said engine to the input of said transmission and means operatively connecting said clutch means into said drive means and other means operatively connecting said steering wheel means to the steering means on the front end assembly;

whereby each of the frame, front end assembly, rear end assembly, engine and control assembly can be manufactured and shipped as separate units and same may then be assembled easily and quickly and by the use of only simple tools.

* * * * *